US012614536B2

(12) United States Patent
Milne et al.

(10) Patent No.: US 12,614,536 B2
(45) Date of Patent: Apr. 28, 2026

(54) AUDITORY DEVICES FOR HEARING PROTECTION

(71) Applicant: Sony Group Corporation, Tokyo (JP)

(72) Inventors: James R. Milne, Romona, CA (US); Justin Kenefick, San Diego, CA (US); Wiliam Clay, San Diego, CA (US); Allison Burgueno, Oceanside, CA (US); Gregory Carlsson, Santee, CA (US)

(73) Assignee: SONY GROUP CORPORATION, Tokyo (JP)

( * ) Notice: Subject to any disclaimer, the term of this patent is extended or adjusted under 35 U.S.C. 154(b) by 208 days.

(21) Appl. No.: 18/226,594

(22) Filed: Jul. 26, 2023

(65) Prior Publication Data

US 2025/0037693 A1 Jan. 30, 2025

(51) Int. Cl.
*G10K 11/178* (2006.01)

(52) U.S. Cl.
CPC .............................. *G10K 11/17823* (2018.01)

(58) Field of Classification Search
None
See application file for complete search history.

(56) References Cited

U.S. PATENT DOCUMENTS

| | | | | |
|---|---|---|---|---|
| 9,468,401 | B2 | 10/2016 | Van Hasselt et al. | |
| 10,595,135 | B2 | 3/2020 | Li et al. | |
| 2012/0033827 | A1 | 2/2012 | Murata | |
| 2014/0126733 | A1 * | 5/2014 | Gauger, Jr. | G10K 11/1783 381/71.6 |
| 2017/0142510 | A1 * | 5/2017 | Klimanis | G10L 21/0232 |
| 2019/0130926 | A1 * | 5/2019 | Giri | G10L 17/02 |
| 2021/0065731 | A1 * | 3/2021 | Matsukawa | G10K 11/17873 |
| 2021/0094657 | A1 * | 4/2021 | Radicioni | B63B 21/508 |
| 2022/0369031 | A1 | 11/2022 | Lester | |
| 2022/0417647 | A1 | 12/2022 | Sun | |

FOREIGN PATENT DOCUMENTS

CN 112767908 A 5/2021

* cited by examiner

*Primary Examiner* — Fan S Tsang
(74) *Attorney, Agent, or Firm* — Trellis IP Law Group, PC

(57) ABSTRACT

A computer-implemented method provides hearing protection with an auditory device includes monitoring background noise to identify an ambient noise condition. The method further includes outputting a determination that one or more presets correspond to the ambient noise condition. The method further includes applying, with the auditory device, the one or more presets, wherein the one or more presets reduce or block the background noise associated with the ambient noise condition based on patterns associated with the ambient noise condition.

11 Claims, 9 Drawing Sheets

AUDITORY DEVICES FOR HEARING PROTECTION

BACKGROUND

Hearing aids and other auditory devices are used to block out certain noises. For example, a user may manually initiate noise cancellation to block out sounds. However, this process may be arduous, especially if the noise comes and goes, because the user does not want to have to keep turning the noise cancellation on and off. In addition, noise-cancelling headphones do not work for certain sounds, such as fireworks, because they are designed to filter out consistent, ambient noise rather than sudden low-frequency booms. As a result, the user may experience hearing damage.

SUMMARY

In some embodiments, a computer-implemented method provides hearing protection with an auditory device. The method includes monitoring, with an auditory device, background noise to identify an ambient noise condition. The method further includes outputting a determination that one or more presets correspond to the ambient noise condition. The method further includes applying, with the auditory device, the one or more presets, wherein the one or more presets reduce or block the background noise associated with the ambient noise condition based on patterns associated with the ambient noise condition.

In some embodiments, the determination that the one or more presets correspond to the ambient noise condition is performed by a machine-learning model and the machine-learning model is trained by: providing training data that includes different ambient noise conditions, information about how the different ambient noise conditions change as a function of time, and a set of presets that reduce or block the background noise associated with the different ambient noise conditions, generating feature embeddings from the training data that group features of the different noise conditions based on similarity, providing training ambient noise conditions as input to the machine-learning model, outputting one or more training presets that correspond to each training ambient noise condition, comparing the one or more training presets to groundtruth data, and modifying parameters of the machine-learning model based on a loss function that identifies a difference of the one or more training presets to the groundtruth data.

In some embodiments, prior to identifying the ambient noise condition, the method further comprises: receiving an identification of the ambient noise condition from a user associated with the auditory device, sampling the background noise for a period of time, and outputting, with a machine-learning model, the one or more presets for the ambient noise condition that modify adjustments in sound levels based on the patterns associated the ambient noise condition. In some embodiments, determining the ambient noise condition includes determining that the background noise includes one or more frequencies that exceed a threshold frequency and applying the one or more presets includes reducing or blocking the background noise corresponding to the one or more frequencies.

In some embodiments, applying the one or more presets includes applying a high-frequency shelf that prevents a sound level of the background noise from exceeding a high-frequency protection preset curve as a function of frequency. In some embodiments, applying the one or more presets includes applying a parametric equalizer that defines one or more selected from the group of a width of one or more frequency bands, a center frequency for each of the one or more frequency bands, a quality factor of the one or more frequency bands, a gain for each of the one or more frequency bands, and combinations thereof. In some embodiments, the parametric equalizer includes a notch that reduces or blocks the background noise for a particular frequency band. In some embodiments, applying the one or more presets includes applying a compressor that adjusts the gain of background noise associated with the ambient noise condition based on a hearing profile associated with a user, wherein the compressor is configured to apply at a first predetermined time and to stop applying at a second predetermined time. In some embodiments, applying the one or more presets includes applying automatic gain control that increases a sound level for a subset of frequencies based on a hearing profile associated with the auditory device. In some embodiments, applying the one or more presets includes applying adaptive noise cancellation to reduce or block the ambient noise condition. In some embodiments, the method further includes generating a user interface that includes a set of presets, wherein the one or more presets are selected from the set of presets by a user.

In some embodiments, an auditory device includes one or more processors and logic encoded in one or more non-transitory media for execution by the one or more processors and when executed are operable to: monitor background noise to identify an ambient noise condition, output a determination that one or more presets correspond to the ambient noise condition, and apply the one or more presets, where the one or more presets reduce or block the background noise associated with the ambient noise condition based on patterns associated with the ambient noise condition.

In some embodiments, the determination that the one or more presets correspond to the ambient noise condition is performed by a machine-learning model and the machine-learning model is trained by: providing training data that includes different ambient noise conditions, information about how the different ambient noise conditions change as a function of time, and a set of presets that reduce or block the background noise associated with the different ambient noise conditions, generating feature embeddings from the training data that group features of the different noise conditions based on similarity, providing training ambient noise conditions as input to the machine-learning model, outputting one or more training presets that correspond to each training ambient noise condition, comparing the one or more training presets to groundtruth data, and modifying parameters of the machine-learning model based on a loss function that identifies a difference of the one or more training presets to the groundtruth data.

In some embodiments, determining the ambient noise condition includes determining that the background noise includes one or more frequencies that exceed a threshold frequency and applying the one or more presets includes reducing or blocking the background noise corresponding to the one or more frequencies. In some embodiments, applying the one or more presets includes applying a high-frequency shelf that prevents a sound level of the background noise from exceeding a high-frequency protection preset curve as a function of frequency.

In some embodiments, software is encoded in one or more computer-readable media for execution by the one or more processors and when executed is operable to: monitor background noise to identify an ambient noise condition, output a determination that one or more presets correspond to the ambient noise condition, and apply the one or more presets, where the one or more presets reduce or block the background noise associated with the ambient noise condition based on patterns associated with the ambient noise condition.

In some embodiments, the determination that the one or more presets correspond to the ambient noise condition is performed by a machine-learning model and the machine-learning model is trained by: providing training data that includes different ambient noise conditions, information about how the different ambient noise conditions change as a function of time, and a set of presets that reduce or block the background noise associated with the different ambient noise conditions, generating feature embeddings from the training data that group features of the different noise conditions based on similarity, providing training ambient noise conditions as input to the machine-learning model, outputting one or more training presets that correspond to each training ambient noise condition, comparing the one or more training presets to groundtruth data, and modifying parameters of the machine-learning model based on a loss function that identifies a difference of the one or more training presets to the groundtruth data.

In some embodiments, determining the ambient noise condition includes determining that the background noise includes one or more frequencies that exceed a threshold frequency and applying the one or more presets includes reducing or blocking the background noise corresponding to the one or more frequencies. In some embodiments, applying the one or more presets includes applying a high-frequency shelf that prevents a sound level of the background noise from exceeding a high-frequency protection preset curve as a function of frequency. In some embodiments, applying the one or more presets includes applying a parametric equalizer that defines one or more selected from the group of a width of one or more frequency bands, a center frequency for each of the one or more frequency bands, a quality factor of the one or more frequency bands, a gain for each of the one or more frequency bands, and combinations thereof.

The technology advantageously provides a way to protect users from sounds that they find unpleasant or, even worse, that may harm their hearing. In some embodiments, the hearing application uses a machine-learning model that is trained to predict the behavior of ambient noise conditions to maximize protection.

A further understanding of the nature and the advantages of particular embodiments disclosed herein may be realized by reference of the remaining portions of the specification and the attached drawings.

DETAILED DESCRIPTION OF EMBODIMENTS

Example Environment 100

Figure 1:
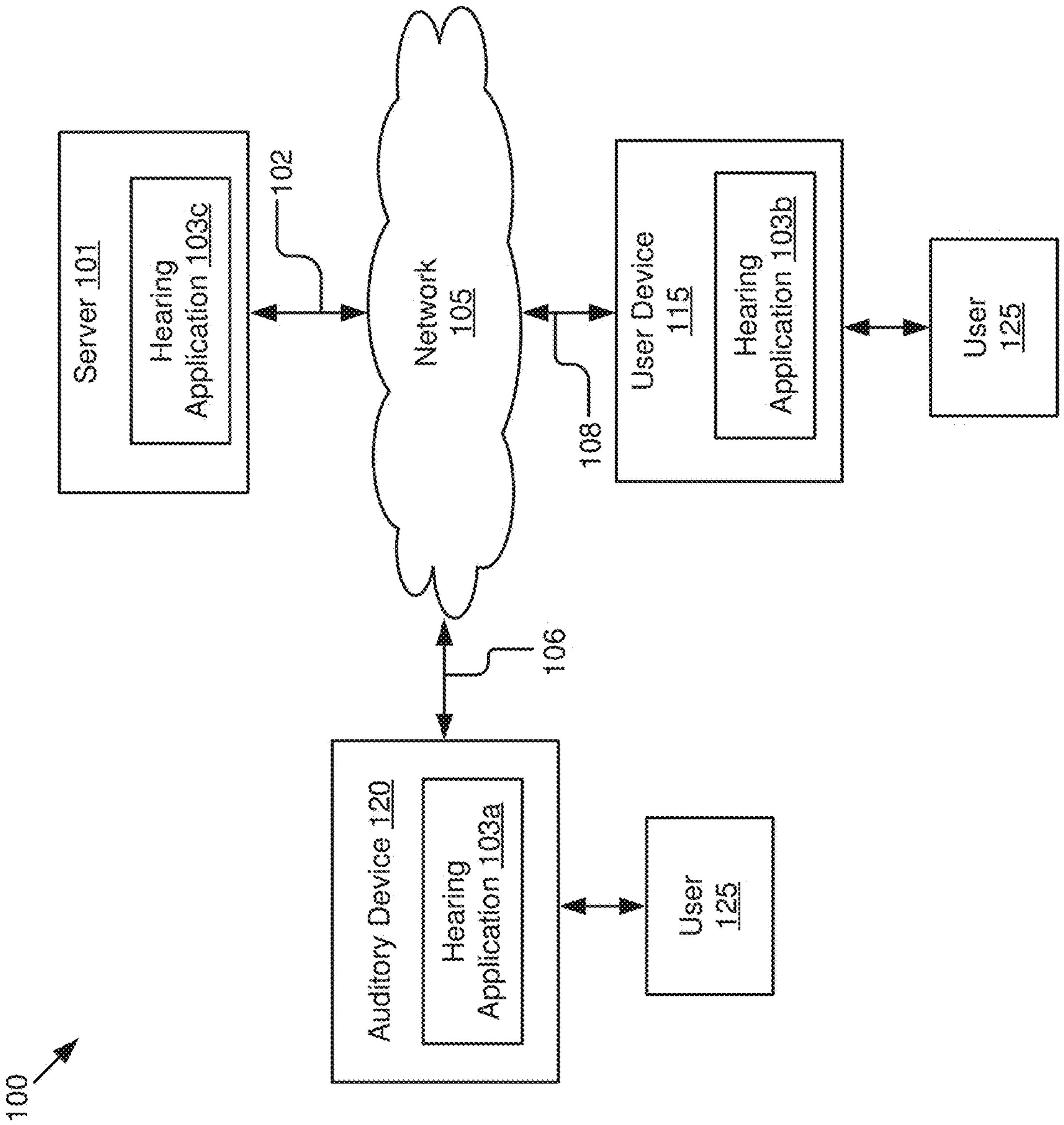
FIG. 1 is a block diagram of an example network environment according to some embodiments described herein.

FIG. 1 illustrates a block diagram of an example environment 100. In some embodiments, the environment 100 includes an auditory device 120, a user device 115, and a server 101. A user 125 may be associated with the user device 115 and the auditory device 120. In some embodiments, the environment 100 may include other servers or devices not shown in FIG. 1. In FIG. 1 and the remaining figures, a letter after a reference number, e.g., "103*a*," represents a reference to the element having that particular reference number (e.g., a hearing application 103*a* stored on the user device 115). A reference number in the text without a following letter, e.g., "103," represents a general reference to embodiments of the element bearing that reference number (e.g., any hearing application 103).

The auditory device 120 may include a processor, a memory, a speaker, and network communication hardware. The auditory device 120 may be a hearing aid, earbuds, headphones, or a speaker device. The speaker device may include a standalone speaker, such as a soundbar or a speaker that is part of a device, such as a speaker in a laptop, tablet, phone, etc.

The auditory device 120 is communicatively coupled to the network 105 via signal line 106. Signal line 106 may be a wired connection, such as Ethernet, coaxial cable, fiber-optic cable, etc., or a wireless connection, such as Wi-Fi®, Bluetooth®, or other wireless technology.

In some embodiments, the auditory device 120 includes a hearing application 103*a* that performs hearing tests. For example, the user 125 may be asked to identify sounds emitted by speakers of the auditory device 120 and the user may provide user input, for example, by pressing a button on the auditory device 120, such as when the auditory device is a hearing aid, earbuds, or headphones. In some embodiments where the auditory device 120 is larger, such as when the auditory device 120 is a speaker device, the auditory device 120 may include a display screen that receives touch input from the user 125.

In some embodiments, the auditory device 120 communicates with a hearing application **103*b* stored on the user device 115. During testing, the auditory device 120 receives instructions from the user device 115 to emit test sounds at particular decibel levels. Once testing is complete, the auditory device 120** receives a hearing profile that includes instructions for how to modify sound based on different factors, such as frequencies, types of sounds, one or more presets, etc.

In some embodiments, the hearing application **103*a* monitors background noise received from the auditory device 120 (e.g., from a microphone that is part of the auditory device 120) to identify an ambient condition. The ambient condition may include noise associated with something that has the potential to damage the user's 125 hearing, such as noise from a sporting event or from a factory, or noise that is unpleasant to the user, such as a baby crying. The hearing application 103*a* outputs a determination that the one or more presets correspond to the ambient noise condition. The hearing application 103*a*** applies the one or more presets based on patterns associated with the ambient noise condition.

The user device 115 may be a computing device that includes a memory, a hardware processor, and a hearing application **103*b*. The user device 115 may include a mobile device, a tablet computer, a laptop, a desktop computer, a mobile telephone, a wearable device, a head-mounted display, a mobile email device, or another electronic device capable of accessing a network 105 to communicate with one or more of the server 101 and the auditory device 120**.

In the illustrated implementation, user device 115 is coupled to the network 105 via signal line 108. Signal line 108 may be a wired connection, such as Ethernet, coaxial cable, fiber-optic cable, etc., or a wireless connection, such as Wi-Fi®, Bluetooth®, or other wireless technology. The user device 115 is used by way of example. While FIG. 1 illustrates one user device 115, the disclosure applies to a system architecture having one or more user devices 115.

In some embodiments, the hearing application **103*b* includes code and routines operable to connect with the auditory device 120 to receive a signal, such as by making a connection via Bluetooth® or Wi-Fi®; implementing a hearing test; and transmitting the hearing profile and the one or more presets to the auditory device 120**.

In some embodiments, the hearing application **103*b* includes a machine-learning model that is trained to output the determination that the one or more presets correspond to the ambient noise condition and to predict when to reduce or remove sounds based on patterns associated with the ambient noise condition. For example, where the ambient noise condition is a drill in a factory, the machine-learning model is trained to predict how often the drill is used and how the frequencies and sound levels change over time when the drill is being used. The hearing application 103*b* may receive the background noise from the auditory device 120** or detect the background noise with a microphone and transmit information about which one or more presets to apply to the auditory device.

In some embodiments, the hearing application **103*b* generates a user interface that enables a user to identify an ambient noise condition that the user wants modified by one or more presets. For example, the user may hear an annoying saw noise that the user wants blocked out. The hearing application 103*b*** may sample the saw noise and provide the sample as input to a machine-learning model that compares the sample to an embedded vector space to identify a similar noise condition and output one or more presets based on the similarity.

The server 101 may include a processor, a memory, and network communication hardware. In some embodiments, the server 101 is a hardware server. The server 101 is communicatively coupled to the network 105 via signal line 102. Signal line 102 may be a wired connection, such as Ethernet, coaxial cable, fiber-optic cable, etc., or a wireless connection, such as Wi-Fi®, Bluetooth®, or other wireless technology. In some embodiments, the server includes a hearing application **103*c*. In some embodiments and with user consent, the hearing application 103*c* on the server 101 maintains a copy of the hearing profile and the one or more presets. In some embodiments, the server 101 maintains audiometric profiles generated by an audiologist for different situations, such as an audiometric profile of a person with no hearing loss, an audiometric profile of a man with no hearing loss, an audiometric profile of a woman with hearing loss, etc. In some embodiments, the hearing application 103*c* on the server 101 includes the trained machine-learning model and provides information to the auditory device 120 and/or the user device 115 about the one or more presets in order to take advantage of greater processing power provided by the server 101**.

Figure 2:
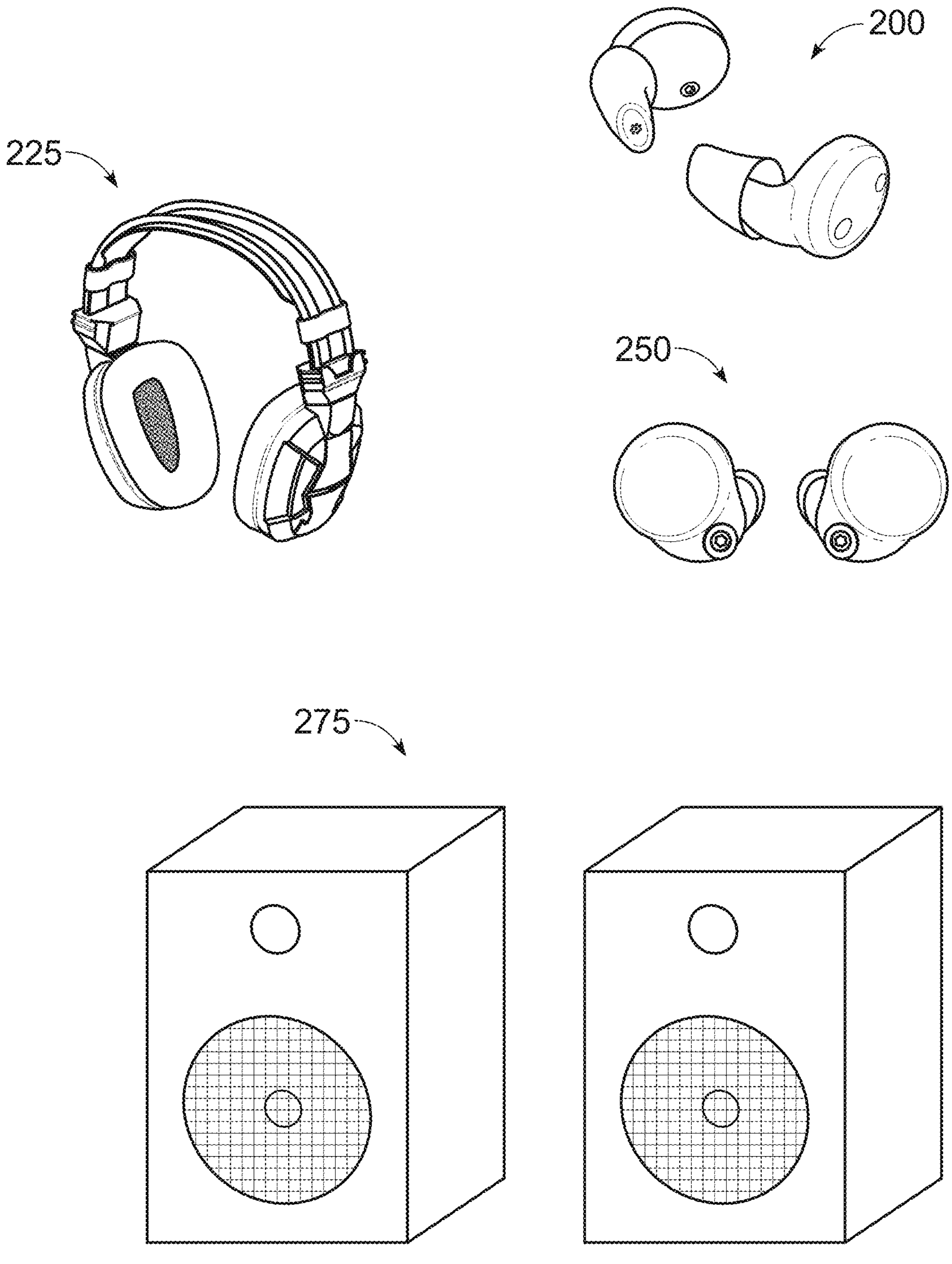
FIG. 2 is an illustration of example auditory devices according to some embodiments described herein.

FIG. 2 illustrates example auditory devices. Specifically, FIG. 2 illustrates a hearing aid 200, headphones 225, earbuds 250, and a speaker device 275. In some embodiments, each of the auditory devices is operable to receive instructions from the hearing application 103 to apply the one or more presets.

Example Computing Device 300

Figure 3A:
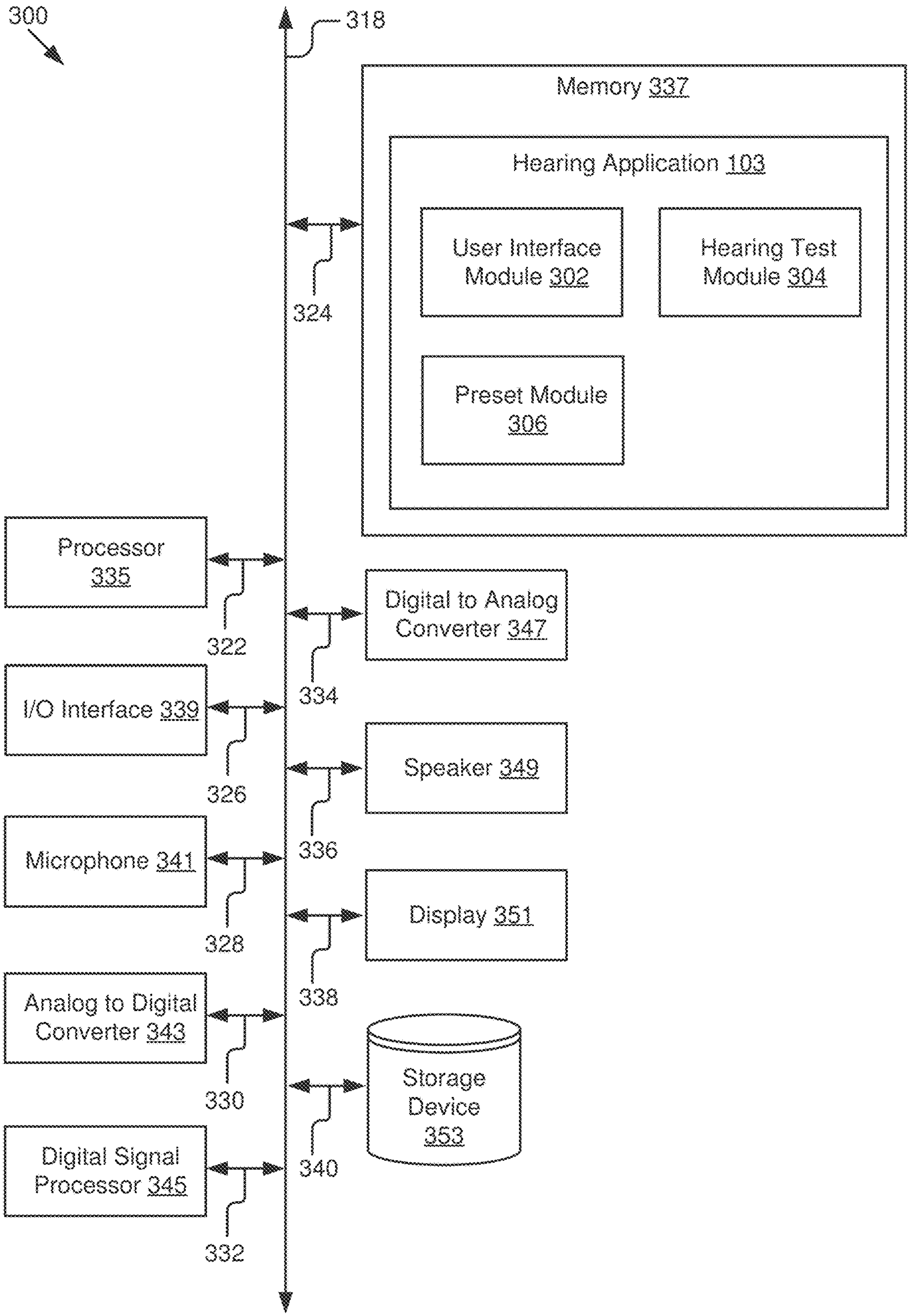
FIG. 3A is a block diagram of an example auditory device according to some embodiments described herein.

FIG. 3A is a block diagram of an example computing device 300 that may be used to implement one or more features described herein. The computing device 300 can be any suitable computer system or other electronic or hardware device. In some embodiments, the computing device 300 is the auditory device 120 in FIG. 1. In some embodiments, the computer device 300 is the user device 115 in FIG. 1. In some embodiments, some portions of the computing device 300 are performed by the auditory device 120 and some portions of the computing device 300 are performed by the user device 115 in FIG. 1.

In some embodiments, computing device 300 includes a processor 335, a memory 337, an Input/Output (I/O) interface 339, a microphone 341, an analog to digital converter 343, a digital signal processor 345, a digital to analog converter 347, a speaker 349, a display 351, and a storage device 353. The processor 335 may be coupled to a bus 318 via signal line 322, the memory 337 may be coupled to the bus 318 via signal line 324, the I/O interface 339 may be coupled to the bus 318 via signal line 326, the microphone 341 may be coupled to the bus 318 via signal line 328, the analog to digital converter 343 may be coupled to the bus 318 via signal line 330, the digital signal processor 345 may be coupled to the bus 318 via signal line 332, the digital to analog converter 347 may be coupled to the bus 318 via signal line 334, the speaker 349 may be coupled to the bus 318 via signal line 336, the display 351 may be coupled to the bus 318 via signal line 338, and the storage device 353 may be coupled to the bus 318 via signal line 340.

The processor 335 can be one or more processors and/or processing circuits to execute program code and control basic operations of the computing device 300. A processor includes any suitable hardware system, mechanism or component that processes data, signals or other information. A processor may include a system with a general-purpose central processing unit (CPU) with one or more cores (e.g., in a single-core, dual-core, or multi-core configuration), multiple processing units (e.g., in a multiprocessor configuration), a graphics processing unit (GPU), a field-programmable gate array (FPGA), an application-specific integrated circuit (ASIC), a complex programmable logic device (CPLD), dedicated circuitry for achieving functionality, or other systems. A computer may be any processor in communication with a memory.

The memory 337 is typically provided in computing device 300 for access by the processor 335 and may be any suitable processor-readable storage medium, such as random access memory (RAM), read-only memory (ROM), Electrical Erasable Read-only Memory (EEPROM), Flash memory, etc., suitable for storing instructions for execution by the processor or sets of processors, and located separate from processor 335 and/or integrated therewith. Memory 337 can store software operating on the computing device 300 by the processor 335, including the hearing application 103.

The I/O interface 339 can provide functions to enable interfacing the computing device 300 with other systems and devices. Interfaced devices can be included as part of the computing device 300 or can be separate and communicate with the computing device 300. For example, network communication devices, storage devices (e.g., the memory 337 or the storage device 351), and input/output devices can communicate via I/O interface 339.

In some embodiments, the I/O interface 339 handles communication between the computing device 300 and the user device via a wireless protocol, such as Bluetooth, Wi-Fi, or Near Field Communication (NFC). In some embodiments, the I/O interface 339 provides information to the user device that identifies a type of the auditory device that is wirelessly connected to the user device.

The microphone 341 includes hardware for detecting sounds. For example, the microphone 341 may detect ambient noises, people speaking, music, etc. The microphone 341 receives acoustical sound signals and converts the signals to analog electrical signals. The analog to digital converter 343 converts the analog electrical signals to digital electrical signals.

Figure 3B:
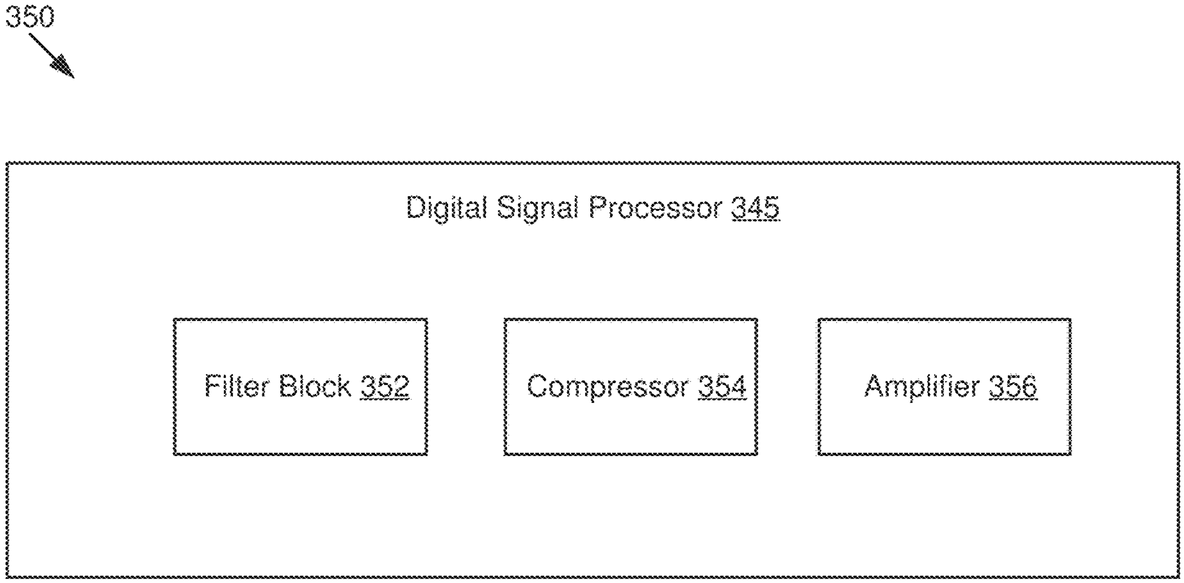
FIG. 3B is a block diagram of an example digital signal processor according to some embodiments described herein.

The digital signal processor 345 includes hardware for converting the digital electrical signals into a digital output signal. Turning to FIG. 3B, an example digital signal processor 345 is illustrated. In some embodiments, the digital signal processor 345 includes a filter block 352, a compressor 354, and an amplifier 356.

The filter block 352 includes hardware that may apply a filter to the digital electrical signals. For example, the filter block 352 may apply a filter that removes sounds corresponding to a particular frequency or that modifies the sound level associated with the particular frequency. For example, the filter block 352 may include a high-frequency shelf that prevents a sound level of the background noise from exceeding a high-frequency protection preset curve based on a frequency of the background noise.

The compressor 354 may include hardware that is used to compress the dynamic range of input sounds so that they more closely match the dynamic range desired by the user while ensuring that the sounds are audible to the user. In some embodiments, the compressor 354 adjusts the gain of signals at a particular frequency where the user has hearing loss. For example, if a user has hearing loss at a higher frequency, the compressor 354 may adjust the gain of those signals.

The amplifier 346 is used to amplify certain sounds based on a particular setting. For example, the amplifier 346 may apply a gain to particular frequencies when a user has been identified as suffering hearing loss at those particular frequencies. In some embodiments, the amplifier 346 reduces or blocks a signal heard by the user by sending an inverted signal that sums with the outside noise before it reaches the user's ear. The amplifier 346 transmits the digital output signal to a digital-to-analog converter 347.

The digital-to-analog converter 347 may include hardware that is used to convert the digital output signal into an analog electrical signal, which is used by the speaker 349 to produce an audio signal that is heard by the user.

In some embodiments where the computing device 300 is a user device, the computing device 300 includes a display 351. The display 351 may connect to the I/O interface 339 to display content, e.g., a user interface, and to receive touch (or gesture) input from a user. The display 351 can include any suitable display device such as a liquid crystal display (LCD), light emitting diode (LED), or plasma display screen, television, monitor, touchscreen, or other visual display device.

The storage device 353 stores data related to the hearing application 103. For example, the storage device 353 may store hearing profiles generated by the hearing application 103, sets of test sounds, a hearing profile, training data for a machine-learning model, and one or more presets.

Although particular components of the computing device 300 are illustrated, other components may be added or removed.

Example Hearing Application 103

The hearing application 103 includes one or more of a user interface module 302, a hearing test module 304, and a preset module 306. For example, a first computing device 300 may be an auditory device that includes the hearing test module 304 and the preset module 306. A second computing device may be an auditory device that includes the user interface module 302, the hearing test module 304, and the preset module 306.

The user interface module 302 generates graphical data for displaying a user interface. In some embodiments, a user downloads the hearing application onto a user device. The user interface module 302 may generate graphical data for displaying a user interface where the user provides input that the hearing test module 304 uses to generate a hearing profile for a user. For example, the user may provide a username and password, input their name, and provide an identification of an auditory device (e.g., identify whether the auditory device is a hearing aid, headphones, earbuds, or a speaker device).

In some embodiments, the user interface includes an option for specifying a particular type of auditory device and a particular model that is used during testing. For example, the hearing aids may be Sony C10 self-fitting over-the-counter hearing aids (model CRE-C10) or E10 self-fitting over-the-counter hearing aids (model CRE-E10). The identification of the type of auditory device is used for, among other things, determining a beginning decibel level for the test sounds. For example, because hearing aids, earbuds, and headphones are so close to the ear (and are possibly positioned inside the ear), the beginning decibel level for a hearing aid is 0 decibels. For testing of a speaker device, the speaker device should be placed a certain distance from the user and the beginning decibel level may be modified according to that distance. For example, for a speaker device that is within 5 inches of the user, the beginning decibel level may be 10 decibels.

In some embodiments, once the user has selected a type of auditory device, the user interface module 302 generates a user interface for specifying a model of the auditory device. For example, the user interface module 302 may generate graphical data for displaying a list of different types of Sony headphones. For example, the list may include WH-1000XM4 wireless Sony headphones, WH-CH710N wireless Sony headphones, MDR-ZX110 wired Sony headphones, etc. Other Sony headphones may be selected. In some embodiments, the user interface module 302 may generate graphical data to display a list of models from other manufacturers.

The user interface module 302 generates graphical data for displaying a user interface that allows a user to select a hearing test. For example, the hearing test module 304 may implement pink noise band testing, speech testing, music testing, etc. In some embodiments, the user may select which type of test is performed first. In some embodiments, before testing begins, the user interface includes an instruction for the user to move to an indoor area that is quiet and relatively free of background noise.

In some embodiments, the user interface module 302 generates graphical data for displaying a user interface to select a number of listening bands for the hearing testing. For example, the user interface may include radio buttons for selecting a particular number of listening bands or a field where the user may enter a number of listening bands.

Once the different tests begin, in some embodiments, the user interface module 302 generates graphical data for displaying a user interface with a way for the user to identify when the user hears a sound generated by the auditory device. For example, the user interface may include a button that the user can select when the user hears a sound. In some embodiments, the user interface module 302 generates a user interface during speech testing that includes a request to identify a particular word from a list of words. This helps identify words or sound combinations that the user may have difficulty hearing.

In some embodiments, the user interface module 302 may generate graphical data for displaying a user interface that allows a user to repeat the hearing tests. For example, the user may feel that the results are inaccurate and may want to test their hearing to see if there has been an instance of hearing loss that was not identified during testing. In another example, a user may experience a change to their hearing conditions that warrants a new test, such as a recent infection that may have caused additional hearing loss.

In some embodiments, the user interface module 302 generates graphical data for displaying a user interface for selecting one or more presets from a set of presets as is discussed in greater detail below with reference to FIG. 5A. In some embodiments, the user interface module generates graphical data for displaying a user interface for specifying parameters associated with a preset. For example, the user may specify a maximum preferred volume, a width of bands used for the parametric equalizer preset, etc. In one embodiment, the user interface module 302 generates graphical data for displaying a user interface that enables a user to specify an ambient noise condition for which the user wants to reduce or block the sound as is discussed in greater detail below with reference to FIG. 5B.

In some embodiments, the user interface module 302 generates graphical data for a user interface that includes icons for different presets that allows the user to modify the one or more presets. For example, the user interface may include an icon and associated text for a noise cancellation preset, an ambient noise preset, a factory noise preset, a baby noise preset, an airplane noise preset, a tool preset, a sports game preset, a concert preset, a traffic noise preset, a subway noise preset, a firetruck preset, a fire alarm preset, etc. The type of noise preset may include individual icons for presets corresponding to each type of noise, such as one for construction noise and another for noises at a particular frequency.

In some embodiments, the user interface module 302 generates graphical data for displaying a user interface that includes an option to override the one or more presets. For example, continuing with the example above, the user interface may include icons for different presets and selecting a particular preset causes the user interface to display information about the particular preset. For example, selecting the ambient noise preset may cause the user interface to show that the ambient noise preset is automatically on. The user may provide feedback, such as turning off the ambient noise preset so that it is automatically off. The preset module 306 may update the one or more presets based on the feedback from the user.

The hearing test module 304 conducts a hearing test by instructing the speaker 349 to emit sounds. In some embodiments, the hearing test is administered by a user marking in a user interface displayed on the user device whether the user heard a particular sound. In some embodiments, the hearing test module 304 stored on the user device generates the hearing profile once testing is complete and transmits the hearing profile to the user device.

The hearing test module 304 generates a hearing profile after receiving user input provided via the user interface. For example, the hearing test module 304 instructs the auditory device to play a sound at a particular decibel level, receives user input via the user interface when the user can hear the sound, and generates a hearing profile that indicates a frequency at which the user can hear the sound. The hearing test module 304 may use multiple types of tests. For example, the hearing test module 304 may implement pink band testing that determines the decibels at which pink bands are audible to users. The hearing test module 304 may also implement speech testing to determine circumstances when speech is most audible to the user and implement music testing to determine circumstances when music is most audible to the user.

In some embodiments, the hearing test module 304 modifies the hearing profile to include instructions for producing sounds based on a corresponding frequency according to a Fletcher Munson curve. The Fletcher Munson curve identifies a phenomenon of human hearing where as an actual loudness changes, the perceived loudness that a human's brain hears will change at a different rate, depending on the frequency. For example, at low listening volumes mid-range frequencies sound more prominent, while the low and high frequency ranges seem to fall into the background. At high listening volumes the lows and highs sound more prominent, while the mid-range seems comparatively softer.

In some embodiments, the hearing test module 304 receives an audiometric profile from the server and compares the hearing profile to the audiometric profile in order to make recommendations for the user. In some embodiments, the hearing test module 304 modifies the hearing profile to include instructions for producing sounds based on a comparison of the hearing profile to the audiometric profile. For example, the hearing test module 304 may identify that there is a 10-decibel hearing loss at 400 Hertz based on comparing the hearing profile to the audiometric profile and the hearing profile is updated with instructions to produce sounds by increasing the auditory device by 10 decibels for any noises that occur at 400 Hertz.

The preset module 306 monitors the background noise to identify an ambient noise condition. For example, the digital signal processor 345 may communicate with the preset module 306 via the I/O interface 339 to identify when the background noise meets a predetermined threshold noise level. In some embodiments, the preset module 306 determines that the background noise meets the predetermined threshold noise for a particular frequency.

The preset module 306 determines that one or more presets correspond to the ambient noise condition and applies the one or more presets. The one or more presets predict when to reduce, remove, and/or amplify sounds at particular frequencies based on patterns associated with the ambient noise condition. For example, the sound of a baby may adhere to a particular pattern where the baby's cry is painfully loud at first, but then decreases, and then increases again. The preset module 306 may apply a high-frequency shelf to block the high frequencies and a parametric equalizer preset to reduce the loudness of the scream. In another example, a band saw may emit sounds at particular decibel levels and particular frequencies in a pattern that the preset module 306 uses to determine when to reduce, remove, and/or amplify sounds.

The preset module 306 instructs the auditory device to apply the one or more presets. For example, the preset module 306 may determine that the ambient noise condition includes one or more frequencies that exceed a threshold frequency and the preset module 306 may apply a preset that includes reducing or blocking the ambient noise condition corresponding to the one or more frequencies. The preset module 306 may instruct the filter block 352 to apply a filter that reduces or blocks the one or more frequencies.

In some embodiments, the one or more presets includes an adaptive noise cancellation preset. The preset module 306 may apply the preset by instructing the digital signal processor 345 to reduce or block the ambient noise condition using adaptive noise cancellation by mapping the ambient noise condition to what the user will hear with the auditory device in order to generate an anti-noise signal that is an inverted waveform that effectively cancels the waveform corresponding to the ambient noise condition.

In some embodiments, the preset module 306 determines that the user prefers the adaptive noise cancellation preset and, as a result, the noise cancellation preset is automatically used. In some embodiments, the adaptive noise cancellation preset is applied to particular situations. For example, the preset module 306 may determine that the user wants the adaptive noise cancellation preset to be activated when the user has a telephone call, but not when the user is listening to music.

In some embodiments, the one or more presets includes a noise cancellation and ambient noise preset that may cause the auditory device to provide a user with cancellation of noises that are not directly surrounding the user while allowing in sounds that directly surround the user through the ambient noise aspect of the preset. In some examples, the noise cancellation and ambient noise preset includes three options: a first setting activates the ambient noise function and the noise cancellation function, a second setting turns off the noise-cancellation function so only the ambient noise function is active, and a third setting turns off the ambient noise function so only the noise cancellation function is activated.

In some embodiments, the preset module 306 may apply a preset that adjusts the gain of sound at a particular frequency. For example, the preset module 306 may instruct the compressor 354 to adjust the gain of the background noise associated with a person that is whispering while other presets reduce sounds, such as from a basketball game that includes reflective noise that interferes with a user's ability to hear. The compressor 354 may adjust the frequencies at a first predetermined time (e.g., 10 ms, 1 second) and stop adjusting the frequencies at a second predetermined time (e.g., 5 ms, 2 seconds). The timing for applying and stopping the compressor 354 may be referred to as attack time and release time, respectively.

In some embodiments, the preset module 306 determines which frequencies to amplify based on a hearing profile. For example, the preset module 306 may adjust the gain of the particular frequency at which the user has experienced minimal or reduced hearing loss. The compressor 354 may adjust the gain of frequencies in a way that allows a user to distinguish between a shout and a whisper.

The preset module 306 may apply one or more presets that include different factors based on a frequency associated with ambient noise condition. For example, turning to FIG. 4A, an example graph 400 of tools is illustrated for defining active noise cancellation, automatic gain control, a high-frequency shelf, and a parametric equalizer based on a frequency threshold 410. The graph 400 includes gain (amplitude) as a function of frequency (f). In this example, below a frequency threshold 410, the preset module 306 applies active noise cancellation (ANC). For example, the preset module 306 may apply active noise cancellation for any thresholds with a frequency below the frequency threshold 410 based on determining that the background noise is associated with an ambient condition.

Figure 4A:
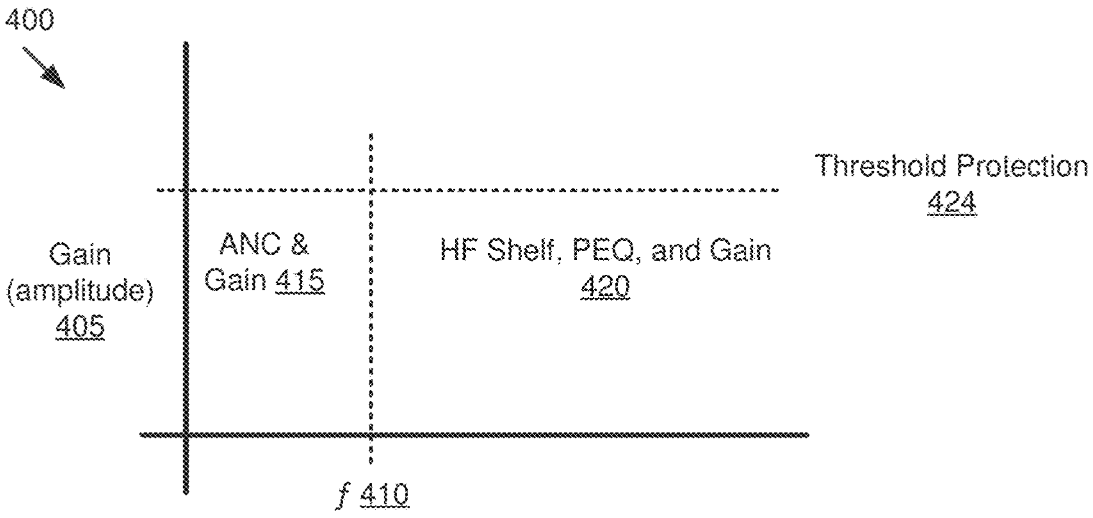
FIG. 4A illustrates an example graph of tools for defining active noise cancellation, automatic gain control, a high-frequency shelf, and a parametric equalizer as a function of frequency according to some embodiments described herein.

In some embodiments, the preset module 306 may apply other presets when the ambient noise condition is associated with a frequency that exceeds the frequency threshold 410. In FIG. 4A, the preset module 306 applies one or more of a high-frequency (HF) shelf, a parametric equalizer (PEQ), and gain 420 to frequencies that exceed the frequency threshold 410.

The preset module 306 may apply gain as a function of a frequency of the ambient noise condition. For example, the preset module 306 may instruct the amplifier 356 to increase the gain of frequencies where the hearing profile associated with a user indicates that the user has suffered hearing loss as long as the gain is below a threshold protection line 424. In some embodiments, the gain may be associated with the frequency threshold 410 such that gain control is applied to all frequencies below the frequency threshold 410 or all frequencies above the frequency threshold 410.

The preset module 306 may apply a high-frequency shelf preset by instructing the digital signal processor 345 to reduce the sound level associated with a particular frequency so that it does not exceed the threshold protection 424.

Figure 4B:
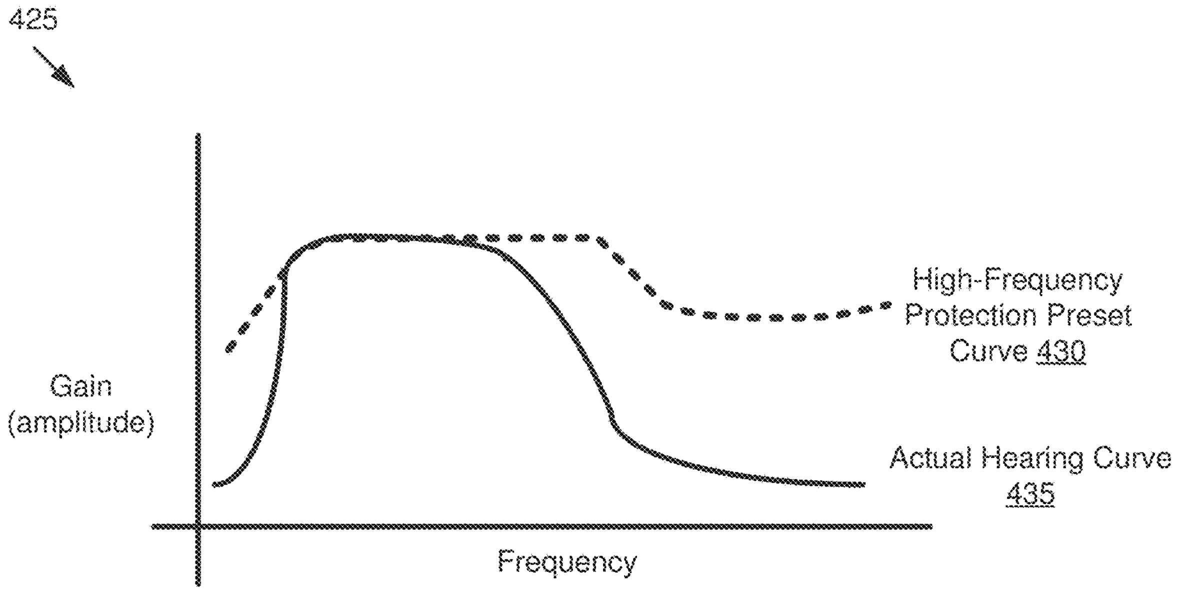
FIG. 4B is an illustration of an example graph of a high-frequency protection preset curve as compared to an actual hearing curve according to some embodiments described herein.

FIG. 4B is an illustration of an example graph 425 of a high-frequency protection preset curve 430 as compared to an actual hearing curve 435. The high-frequency protection preset curve 430 defines a sound level where the preset module 306 instructs the digital signal processor 345 to modify sound levels so that the amplification does not exceed the high-frequency protection preset curve 430. For example, the preset module 306 may instruct the filter block 352 of the digital signal processor 345 to reduce or block sound levels that are higher than the high-frequency protection preset curve 430. In some embodiments, the preset module 306 instructs the amplifier 356 to amplify sounds at particular frequencies up to the high-frequency protection preset curve 430 while maintaining a predetermined difference in sound level to ensure that a signal is not clipped (e.g., maintain headroom of the signal). This results in the user being able to hear all the frequencies better by increasing the loudness of certain frequencies where the user might otherwise have difficulty hearing.

The preset module 306 may apply a preset for an equalizer shelf, which may include the high-frequency protection of the high-frequency shelf as well as low-frequency protection of a low-frequency shelf. The preset module 306 may apply a lower-frequency protection by attenuating or amplifying sounds below a defined cutoff frequency until the frequencies reach a lower cutoff frequency, at which point the attenuation or amplification levels out.

Figure 4C:
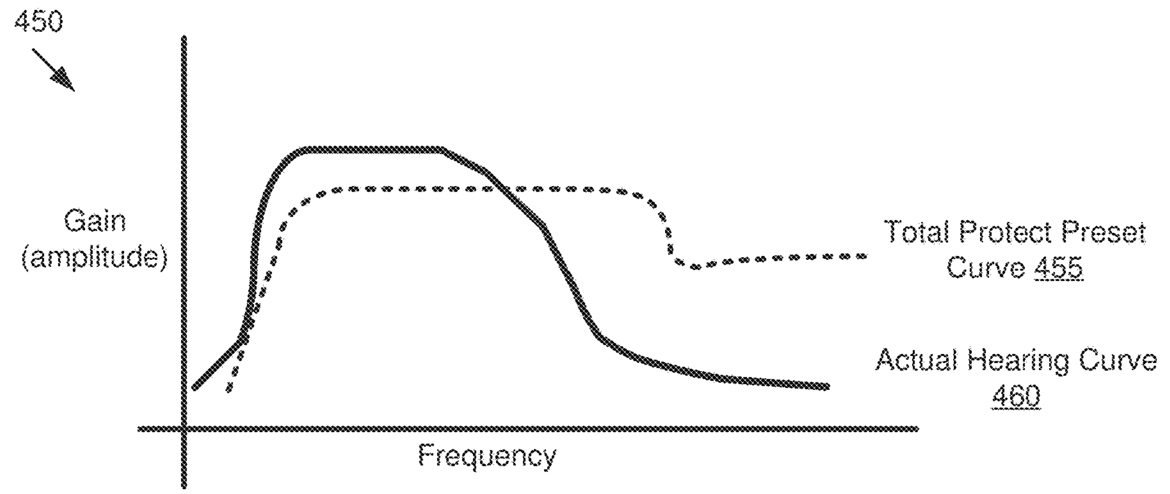
FIG. 4C is an illustration of an example graph of a total protect preset curve as compared to an actual hearing curve according to some embodiments described herein.

FIG. 4C is an illustration of an example graph 450 of a total protect preset curve 455 as compared to an actual hearing curve 460. In this example, the preset module 306 applies a total protect preset curve 455 that is used to protect the user's hearing from particular sound levels at particular frequencies. Even though the user may not hear sounds unless the gain is above the total protect preset curve 455, the preset module 306 prevents the sound level from exceeding the total protect preset curve 455 to ensure that the user does not further harm their hearing.

The preset module 306 may apply the parametric equalizer preset by applying a gain for one or more frequency bands. In some embodiments, the preset module 306 may determine, or the user may define, one or more of a width of the one or more frequency bands, a center frequency for each of the one or more frequency bands, a quality factor (Q) of the one or more frequency bands that is a measure of a sharpness of a resonant peak, and a gain for each of the one or more frequency bands.

In some embodiments, the parametric equalizer may also be used by the preset module 306 to define a notch that reduces or blocks the background noise of an ambient noise condition for a particular frequency.

Figure 4D:
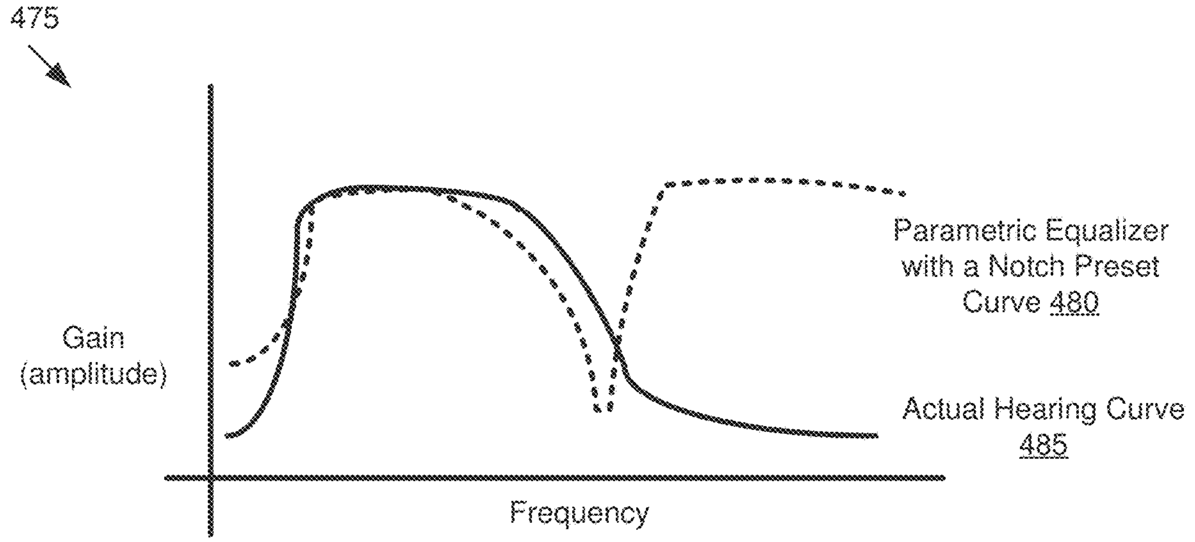
FIG. 4D is an illustration of an example graph of a parametric equalizer with a notch preset curve as compared to an actual hearing curve according to some embodiments described herein.

FIG. 4D is an illustration of an example graph 475 of a parametric equalizer with a notch preset curve 480 as compared to an actual hearing curve 485. In this example, a user may have defined an unpleasant noise at a particular frequency that the user wants to be blocked out. For example, the user may have selected a preset that blocks out the noise of tonal machinery noise. As a result, the preset module 306 applies a parametric equalizer presetting that includes a notch preset curve 480 to block out the frequency associated with tonal machinery noise.

In some embodiments, the preset module 306 assigns one or more default presets. The one or more default presets may be based on the most common presets used by users associated with a particular type of computing device 300. For example, a user may not need an adaptive noise cancellation preset with over-the-ear headphones that are better at blocking noises than other types of auditory devices. In some embodiments, the one or more default presets may be based on the most common presets used by users of a particular demographic (e.g., based on sex, age, similarity of user profiles, etc.). The preset module 306 may implement testing to determine user preferences that correspond to the one or more presets or the preset module 306 may update the one or more default presets in response to receiving feedback from the user.

In some embodiments, once the ambient condition is no longer present, the preset module 306 switches to another preset, such as a music preset or a speech preset. The speech preset may include a variety of different user preferences relating to speech. For example, during the hearing test, the hearing test module 304 may include a speech test that identifies that the user has difficulty hearing certain sounds in speech, such as words that begin with "th" or "sh." As a result, the speech preset may include amplification of words that use those particular sounds.

The music preset may include a variety of different user preferences relating to music. For example, the user may identify that there are certain frequencies or situations during which the user experiences hypersensitivity. For example, the user may identify a particular frequency that causes distress, a particular action that bothers a user (such as construction noises), or based on a particular condition like misophonia (such as chewing or sniffing noises).

In some embodiments, the preset module 306 conducts preset tests to determine user preferences related to the presets. For example, the preset module 306 may instruct the speaker 349 to emit background noises and the user may identify the background noises as being associated with an ambient noise condition that the user wants to reduce or block. The user may provide user input for selecting a preset via a user interface displayed on the user device.

In some embodiments, a user selects one or more presets from a set of presets. The set of presets may be generated by the preset module 306. The set of presets may include a ranked set of the most popular presets selected by users generally, the most popular presets selected by users that are similar to the user, an alphabetic list of presets, etc.

Figure 5A:
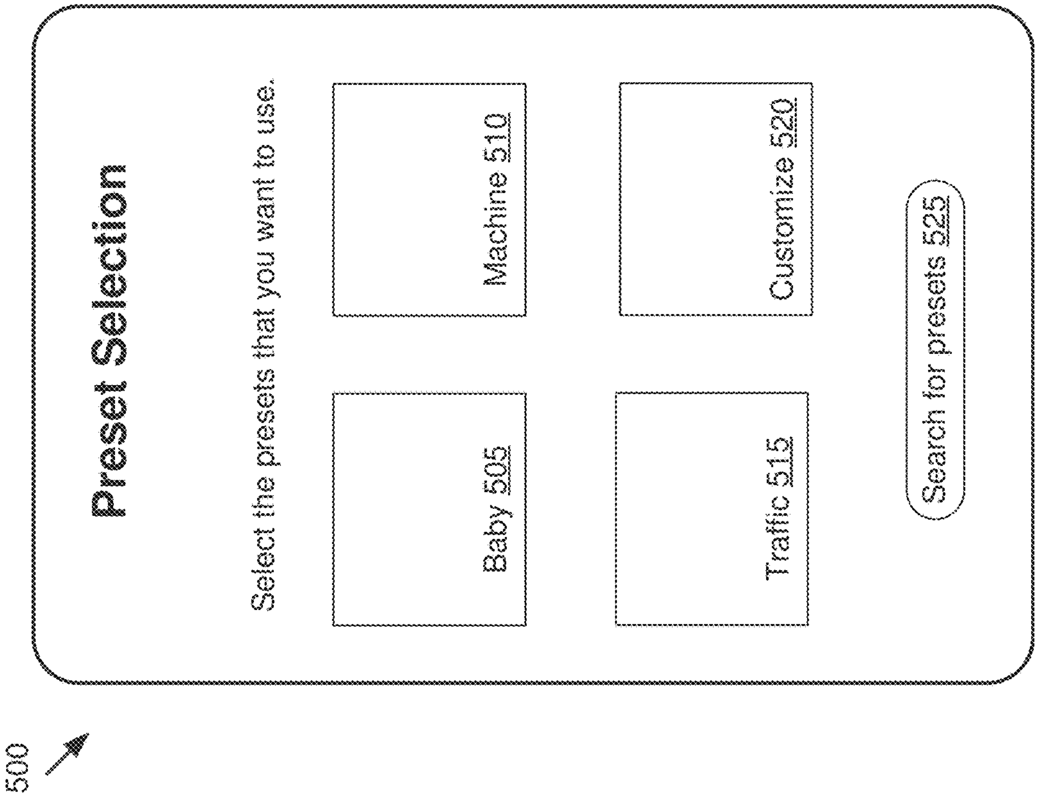
FIG. 5A is an example user interface of different selectable presets according to some embodiments described herein.

FIG. 5A is an example user interface 500 of different selectable presets. In this example, the set of presets includes a baby preset 505, a machine preset 510, and a traffic preset 515. In some embodiments, each preset includes multiple presets that are combined for a particular purpose. For example, the machine preset 510 may include a preset that reduces high frequencies and a noise cancellation preset.

Figure 5B:
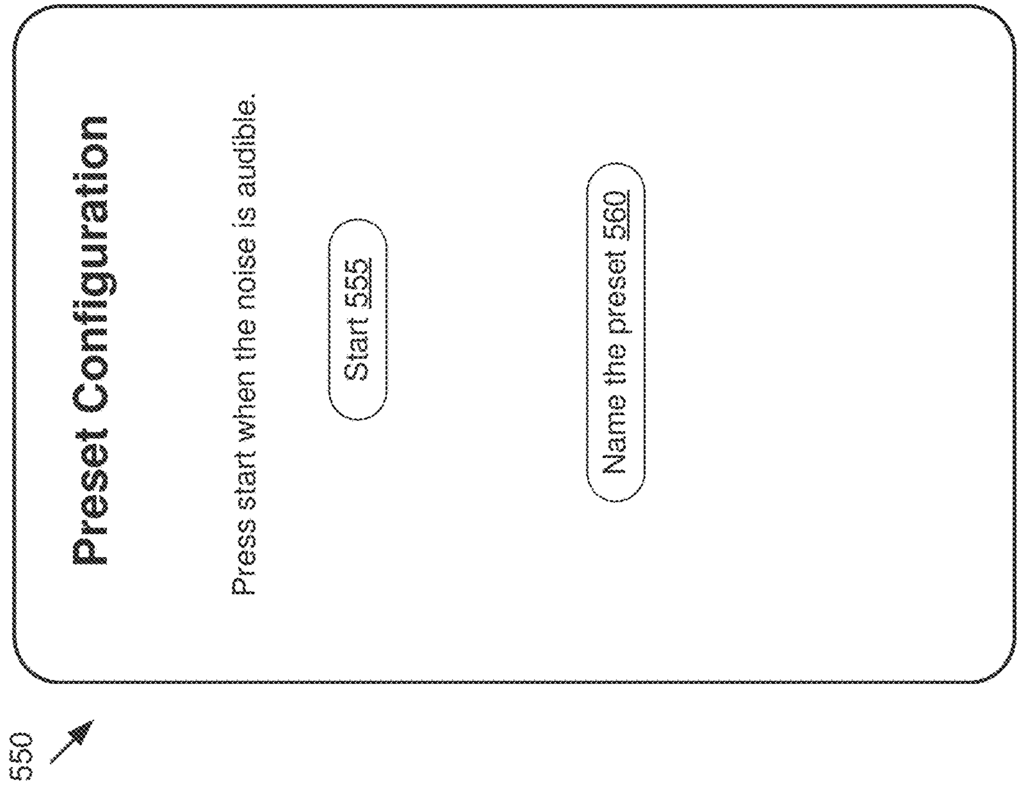
FIG. 5B is an example user interface of an option for configuring a preset according to some embodiments described herein. 5*a*

Pressing the customize preset 520 square may result in the user interface module 302 displaying the user interface in FIG. 5B where a user may create their own preset. The user may also select the search button 525 to search for additional presets.

In some embodiments, the preset module 306 generates one or more of the presets using a machine-learning model. The machine-learning model may be trained using training data that includes different ambient noise conditions and information about how the different ambient noise conditions change as a function of time. For example, when a firework is launched the whistling noise is between 160 to 200 Hertz and the explosion is 16-25 Hertz. There is a predictable pattern for how long it takes for the firework to whistle and then explode. In another example, at a soccer game when a player scores a goal, the cheering follows a pattern of noise that becomes rapidly loud and then quickly attenuates. In yet another example, construction noise may function in a predictable pattern as identified by a machine-learning model.

In some embodiments, the training data also includes a set of presets that reduce or block the background noise associated with the different ambient noise conditions. The set of presets may be labelled for the types of ambient noise conditions and function as part of a supervised learning process for training the machine-learning model.

The preset module 306 generates feature embeddings from the training data that group features of the different noise conditions based on similarity. This is the process of training the machine-learning model may to recognize patterns in different ambient conditions such that the machine-learning model will be able to predict how different ambient conditions will behave in the future based on the patterns.

The machine-learning model receives training ambient noise conditions as input to the machine-learning model and outputs one or more training presets that correspond to each training ambient noise condition. The preset module 306 compares the one or more training presets to groundtruth data that describes the appropriate presets for the ambient noise condition. The preset module 306 calculates a loss function that reflects the difference between the one or more training presets and the groundtruth data. The preset module 306 modifies the parameters of the machine-learning model based on the loss function. The preset module 306 continues this process iteratively until the machine-learning model consistently outputs one or more presets with a minimal loss value.

In some embodiments, the machine-learning model is a neural network. Neural networks can learn and model the relationships between input data and output data that are nonlinear and complex. The neural network may include an input layer, a hidden layer, and an output layer. The input layer may receive input data, the hidden layer takes its input from the input layer or other hidden layers, and the output layer provides the final result of the data processing. The neural network may use a backpropagation algorithm that learns continuously by using corrective feedback loops to improve predictive analytics. The neural network may be a convolutional neural network where the hidden layers perform specific mathematical functions, such as summarizing or filtering.

In some embodiments, the machine-learning model may be used to generate one or more presets.

The preset module 306 includes a machine-learning model that receives information about the background noise as inputs along with the one or more presets and outputs a determination that one or more presets correspond to the ambient noise condition. The training data may be labelled with one or more presets corresponding to users with different demographics (e.g., sex, age, auditory conditions, etc.). The preset module 306 may train the machine-learning model using supervised training data to receive background noise associated with an ambient noise condition as input and output the one or more presets.

In some embodiments, one or more of the presets in the set of presets are generated by a machine-learning model where the machine-learning model outputs the presets independently and/or the machine-learning model outputs the presets based on input from a user. For example, a user may record a sample for a period of time of the ambient noise condition that the user wants reduced or blocked and the sample is used as input to the machine-learning model. The recording may be performed for a predetermined amount of time, identified by the user as starting and stopping, etc. The machine-learning model may output one or more presets for the ambient noise condition that modify adjustments in sound levels based on the patterns associated with the ambient noise condition.

FIG. 5B is an example user interface 550 of an option for configuring a preset. In this example, the user is instructed to press the start button 555 when an ambient condition that the user wants to reduce or block is audible. In some embodiments, the user device records a sample for a predetermined amount of time. In some embodiments, the user interface 550 may include a stop button (not shown) that the user selects to end the recording. The user interface 550 also includes a button 560 for naming the preset.

In some embodiments, the preset module 306 receives feedback from a user. The user may provide user input to a user interface that changes one or more presets. For example, the user may change a preset for streaming audio to include noise cancellation. The preset module 306 updates the one or more presets based on the feedback. In some embodiments, the preset module 306 does not change the one or more presets until a threshold amount of feedback has been received. For example, the preset module 306 may not change a preset until the user has changed the preset a threshold of four times (or three, five, etc.).

In some embodiments, the user may provide user input for changing the presets using hardware that is part of the auditory device or the user device. For example, the user may provide a voice command that is detected by the microphone 341, a voice pick-up sensor (not illustrated) that identifies words or vibrations caused by a user speaking that instructs the auditory device to turn on or off one or more of the presets. In another example, the user may make a gesture that is detected by a motion sensor (not illustrated) that determines that the user is instructing one or more presets to be turned on or off. The preset module 306 may determine that the user input is feedback for modifying the machine-learning model if the user changes the settings more than a predetermined amount of time.

Example Methods

Figure 6:
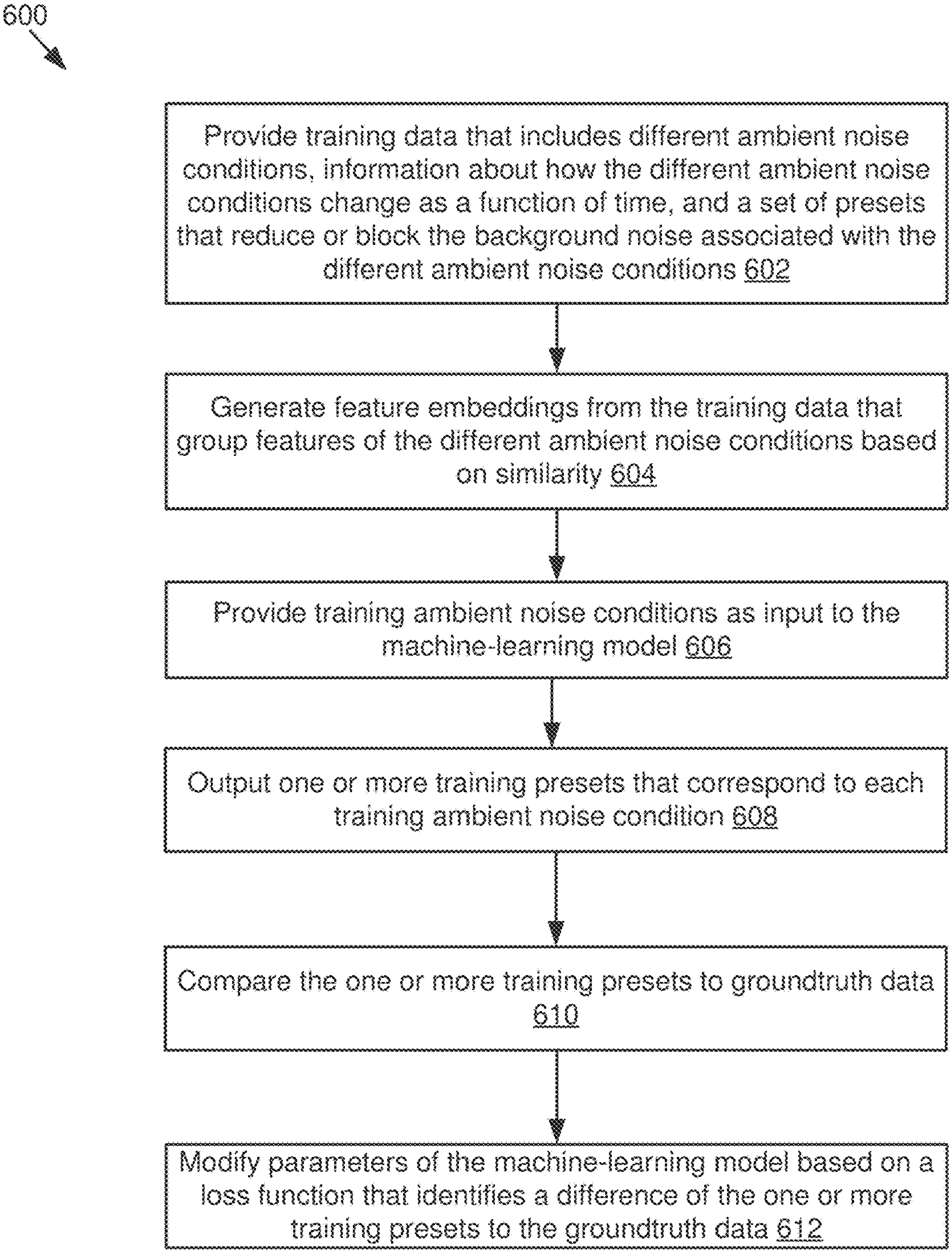
FIG. 6 illustrates a flowchart of an example method to train a machine-learning model to output one or more presets according to some embodiments described herein.

FIG. 6 is a flowchart of an example method to train a machine-learning model to output one or more presets according to some embodiments described herein. The method 600 may be performed by the computing device 300. The computing device 300 includes a hearing application 103 that implements the steps described below.

The method 600 may start with block 602. At block 602 training data is provided data that includes different ambient noise conditions, information about how the different ambient noise conditions change as a function of time, and a set of presets that reduce or block the background noise associated with the different ambient noise conditions. Block 602 may be followed by block 604.

At block 604 feature embeddings are generated from the training data that group features of the different noise conditions based on similarity. Block 604 may be followed by block 606.

At block 606, training ambient noise conditions are provided as input to the machine-learning model. Block 606 may be followed by block 608.

At block 608, one or more training presets are output that correspond to each training ambient noise condition. Block 608 may be followed by block 610.

At block 610, the one or more training presets are compared to groundtruth data. Block 610 may be followed by block 612.

At block 612, parameters of the machine-learning model are modified based on a loss function that identifies a difference of the one or more training presets to the groundtruth data. In some embodiments, blocks 608, 610, and 612 are repeated until a stopping condition is reached, such as a loss value that falls below a threshold loss value.

Figure 7:
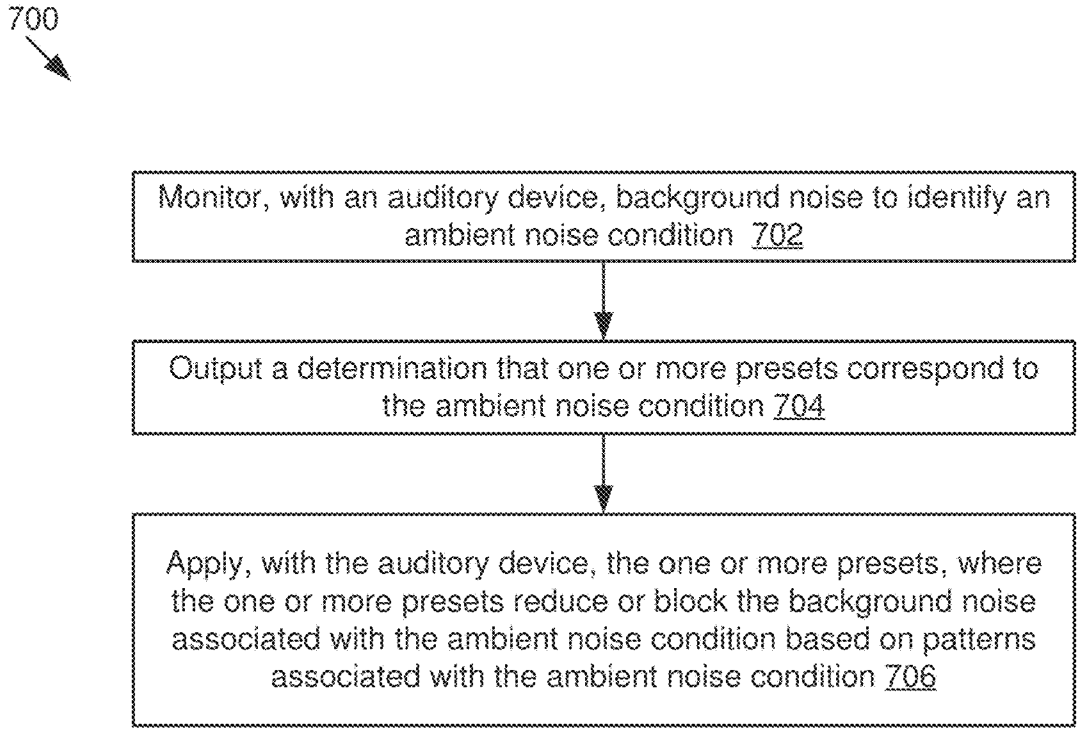
FIG. 7 illustrates a flowchart of an example method to apply one or more presets based on patterns associated with an ambient condition according to some embodiments described herein.

FIG. 7 illustrates a flowchart of an example method to apply one or more presets based on patterns associated with an ambient condition. The method 700 may be performed by the computing device 300. The computing device 300 includes a hearing application 103 that implements the steps described below.

The method 700 may start with block 702. At block 702, an auditory device monitors background noise to identify an ambient noise condition. For example, the background noise may include sounds from a shooting range. Block 702 may be followed by block 704.

At block 704, a determination is output that one or more presets correspond to the ambient noise condition. For example, the determination may include a high-frequency shelf preset that is tailored for the shooting range. Block 704 may be followed by block 706.

At block 706, the auditory device applies the one or more presets, where the one or more presets reduce or block the background noise associated with the ambient noise condition based on patterns associated with the ambient noise condition. For example, the high-frequency shelf that is tailored for the gun range may predict that the noise from the guns is not continuous, but that the sound is generally around 140-170 decibels. The preset module 306 may apply the preset based on the expected pattern of gun noise.

Although the description has been described with respect to particular embodiments thereof, these particular embodiments are merely illustrative, and not restrictive.

Any suitable programming language can be used to implement the routines of particular embodiments including C, C++, Java, assembly language, etc. Different programming techniques can be employed such as procedural or object oriented. The routines can execute on a single processing device or multiple processors. Although the steps, operations, or computations may be presented in a specific order, this order may be changed in different particular embodiments. In some particular embodiments, multiple steps shown as sequential in this specification can be performed at the same time.

Particular embodiments may be implemented in a computer-readable storage medium for use by or in connection with the instruction execution system, apparatus, system, or device. Particular embodiments can be implemented in the form of control logic in software or hardware or a combination of both. The control logic, when executed by one or more processors, may be operable to perform that which is described in particular embodiments.

Particular embodiments may be implemented by using a programmed general purpose digital computer, by using application specific integrated circuits, programmable logic devices, field programmable gate arrays, optical, chemical, biological, quantum or nanoengineered systems, components and mechanisms may be used. In general, the functions of particular embodiments can be achieved by any means as is known in the art. Distributed, networked systems, components, and/or circuits can be used. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope to implement a program or code that can be stored in a machine-readable medium to permit a computer to perform any of the methods described above.

A "processor" includes any suitable hardware and/or software system, mechanism or component that processes data, signals or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real time," "offline," in a "batch mode," etc. Portions of processing can be performed at different times and at different locations, by different (or the same) processing systems. Examples of processing systems can include servers, clients, end user devices, routers, switches, networked storage, etc. A computer may be any processor in communication with a memory. The memory may be any suitable processor-readable storage medium, such as random-access memory (RAM), read-only memory (ROM), magnetic or optical disk, or other non-transitory media suitable for storing instructions for execution by the processor.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

Thus, while particular embodiments have been described herein, latitudes of modification, various changes, and substitutions are intended in the foregoing disclosures, and it will be appreciated that in some instances some features of particular embodiments will be employed without a corresponding use of other features without departing from the scope and spirit as set forth. Therefore, many modifications may be made to adapt a particular situation or material to the essential scope and spirit.

We claim:

1. A computer-implemented method to provide hearing protection with an auditory device, the method comprising:

monitoring, with an auditory device, background noise to identify an ambient noise condition;

determining that the background noise includes one or more frequencies that exceed a threshold frequency;

outputting a determination that one or more presets correspond to the ambient noise condition, wherein the determination that the one or more presets correspond to the ambient noise condition is performed by a machine-learning model and the machine-learning model is trained by:

providing training data that includes different ambient noise conditions, information about how the different ambient noise conditions change as a function of time, and a set of presets that reduce or block the background noise associated with the different ambient noise conditions;

generating feature embeddings from the training data that group features of the different noise conditions based on similarity;

providing training ambient noise conditions as input to the machine-learning model;

outputting one or more training presets that correspond to each training ambient noise condition;

comparing the one or more training presets to groundtruth data; and modifying parameters of the machine-learning model based on a loss function that identifies a difference of the one or more training presets to the groundtruth data; and applying, with the auditory device, the one or more presets, wherein the one or more presets reduce or block the background noise associated with the ambient noise condition based on patterns associated with the ambient noise condition, and wherein applying the one or more presets comprises reducing or blocking the background noise corresponding to the one or more frequencies.

2. The method of claim 1, wherein prior to identifying the ambient noise condition, the method further comprises:

receiving an identification of the ambient noise condition from a user associated with the auditory device;

sampling the background noise for a period of time; and outputting, with a machine-learning model, the one or more presets for the ambient noise condition that modify adjustments in sound levels based on the patterns associated the ambient noise condition.

3. The method of claim 1, wherein applying the one or more presets includes applying a high-frequency shelf that prevents a sound level of the background noise from exceeding a high-frequency protection preset curve as a function of frequency.

4. The method of claim 1, wherein applying the one or more presets includes applying a parametric equalizer that defines one or more selected from a group of a width of one or more frequency bands, a center frequency for each of the one or more frequency bands, a quality factor of the one or more frequency bands, a gain for each of the one or more frequency bands, and combinations thereof.

5. The method of claim 4, wherein the parametric equalizer includes a notch that reduces or blocks the background noise for a particular frequency band.

6. The method of claim 1, wherein applying the one or more presets includes applying a compressor that adjusts a gain of the background noise associated with the ambient noise condition based on a hearing profile associated with a user, wherein the compressor is configured to apply at a first predetermined time and to stop applying at a second predetermined time.

7. The method of claim 1, wherein applying the one or more presets includes applying automatic gain control that increases a sound level for a subset of frequencies based on a hearing profile associated with the auditory device.

8. The method of claim 1, wherein applying the one or more presets includes applying adaptive noise cancellation to reduce or block the ambient noise condition.

9. The method of claim 1, further comprising:

generating a user interface that includes a set of presets, wherein the one or more presets are selected from the set of presets by a user.

10. An auditory device comprising:

one or more processors; and logic encoded in one or more non-transitory media for execution by the one or more processors and when executed are operable to:

monitor background noise to identify an ambient noise condition;

determining that the background noise includes one or more frequencies that exceed a threshold frequency;

output a determination that one or more presets correspond to the ambient noise condition, wherein the determination that the one or more presets correspond to the ambient noise condition is performed by a machine-learning model and the machine-learning model is trained by:

providing training data that includes different ambient noise conditions, information about how the different ambient noise conditions change as a function of time, and a set of presets that reduce or block the background noise associated with the different ambient noise conditions;

generating feature embeddings from the training data that group features of the different noise conditions based on similarity;

providing training ambient noise conditions as input to the machine-learning model;

outputting one or more training presets that correspond to each training ambient noise condition;

comparing the one or more training presets to groundtruth data; and modifying parameters of the machine-learning model based on a loss function that identifies a difference of the one or more training presets to the groundtruth data; and apply the one or more presets, wherein the one or more presets reduce or block the background noise associated with the ambient noise condition based on patterns associated with the ambient noise condition, and wherein applying the one or more presets comprises reducing or blocking the background noise corresponding to the one or more frequencies.

11. The auditory device of claim 10, wherein applying the one or more presets includes applying a high-frequency shelf that prevents a sound level of the background noise from exceeding a high-frequency protection preset curve as a function of frequency.

* * * * *